Figure 1:
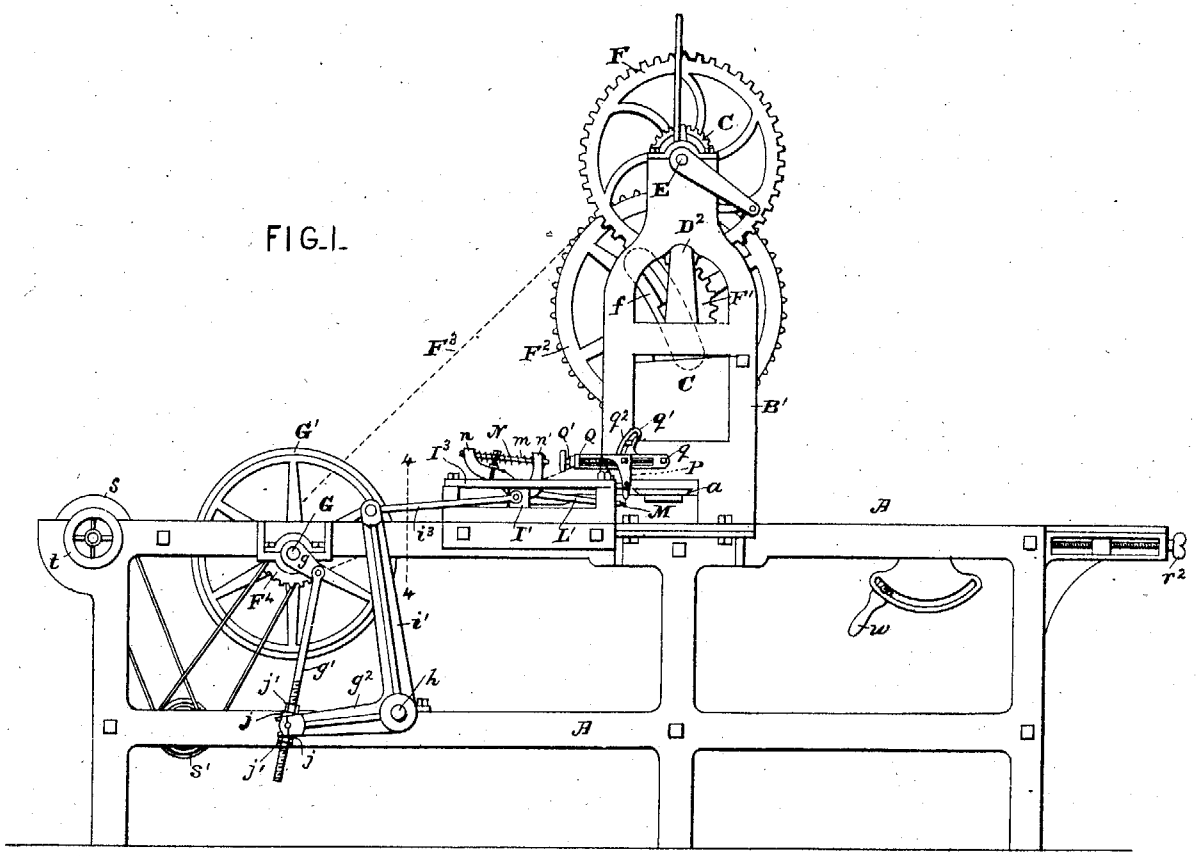

6 Sheets—Sheet 1.

M. DE TAMBLE.

Assignor to ROTH, MCMAHON & CO.

CAKE, JUMBLE, AND SNAP MACHINE.

No. 10,691. Reissued Feb. 23, 1886.

Attest:
Geo. T. Smallwood.
Douglas Depenforth.

Inventor:
Martin De Tamble.
By Browning & Browning
Attys.

6 Sheets—Sheet 2.
M. DE TAMBLE.
Assignor to ROTH, MCMAHON & CO.
CAKE, JUMBLE, AND SNAP MACHINE.
No. 10,691. Reissued Feb. 23, 1886.
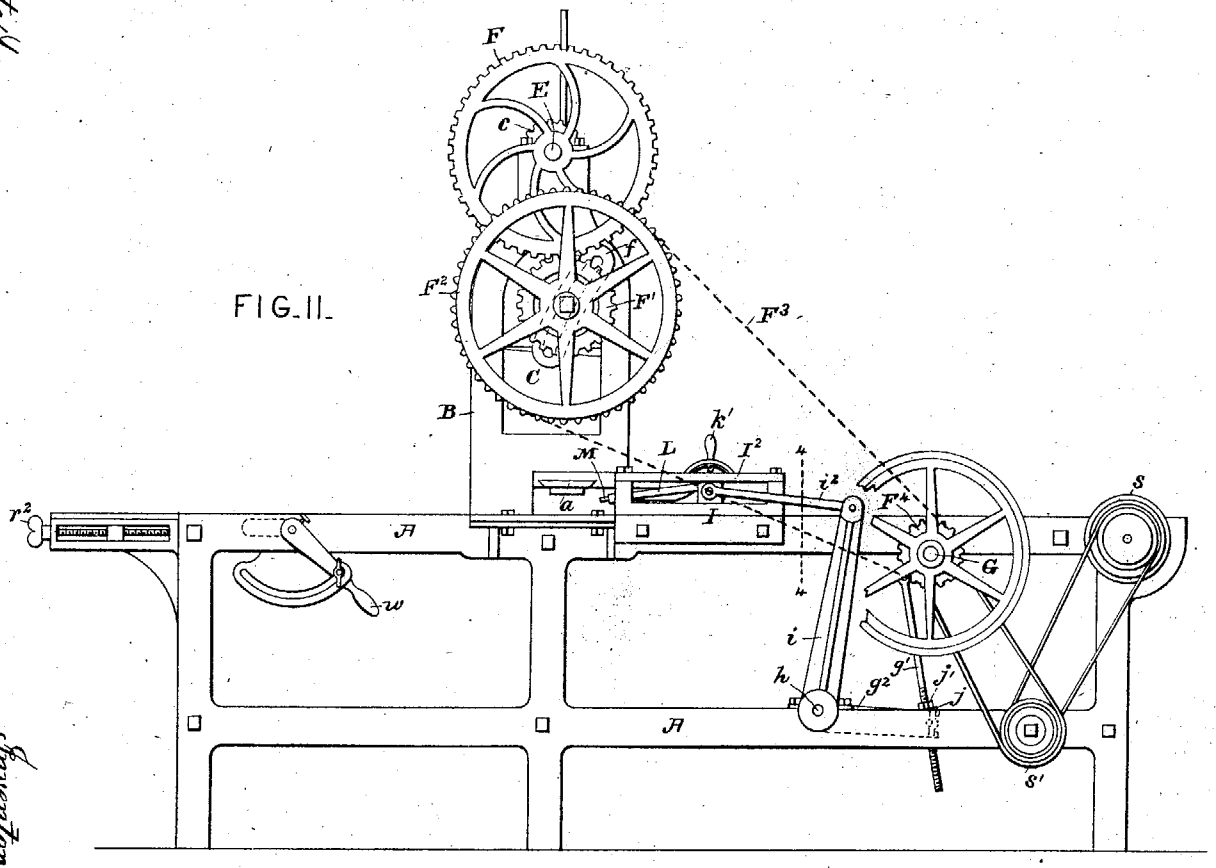
FIG. II.
Attest:
Geo. T. Smallwood.
Douglas Dupenfonth.
Inventor:
Martin De Tamble.
By Banning & Banning
Atty.

6 Sheets—Sheet 3.
M. DE TAMBLE.
Assignor to ROTH, MCMAHON & CO.
CAKE, JUMBLE, AND SNAP MACHINE.
No. 10,691. Reissued Feb. 23, 1886.
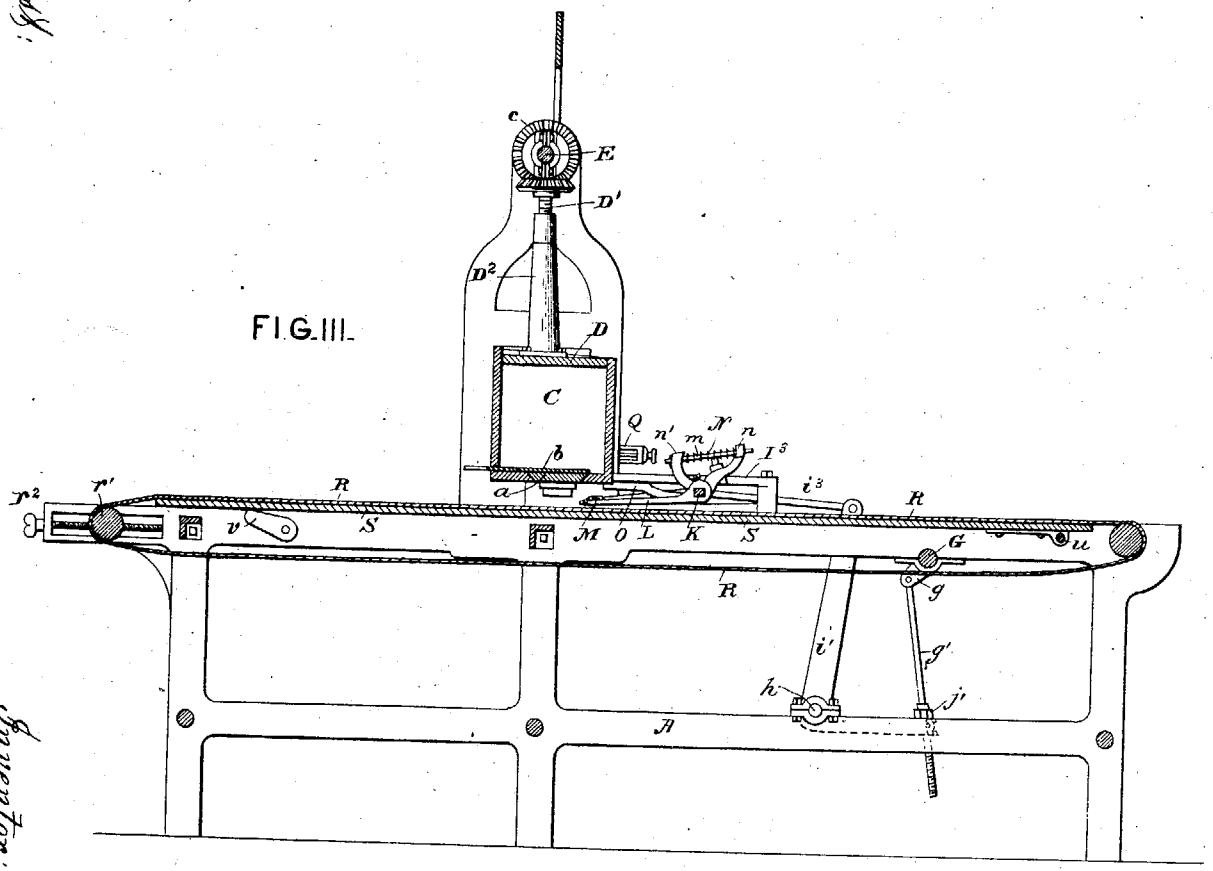
FIG. III.
Attest:
Geo. T. Smallwood.
Douglas Dupendorff.
Inventor:
Martin De Tamble
By Banning & Banning
Atty.

M. DE TAMBLE.
Assignor to ROTH, MCMAHON & CO.
CAKE, JUMBLE, AND SNAP MACHINE.
No. 10,691. Reissued Feb. 23, 1886.
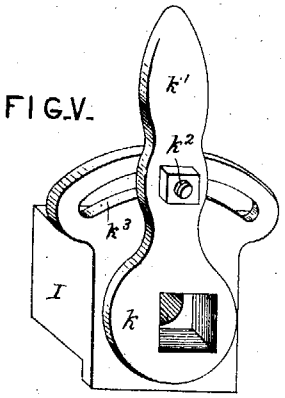
FIG. V.
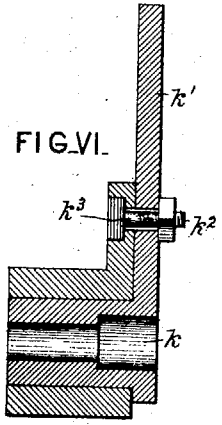
FIG. VI.
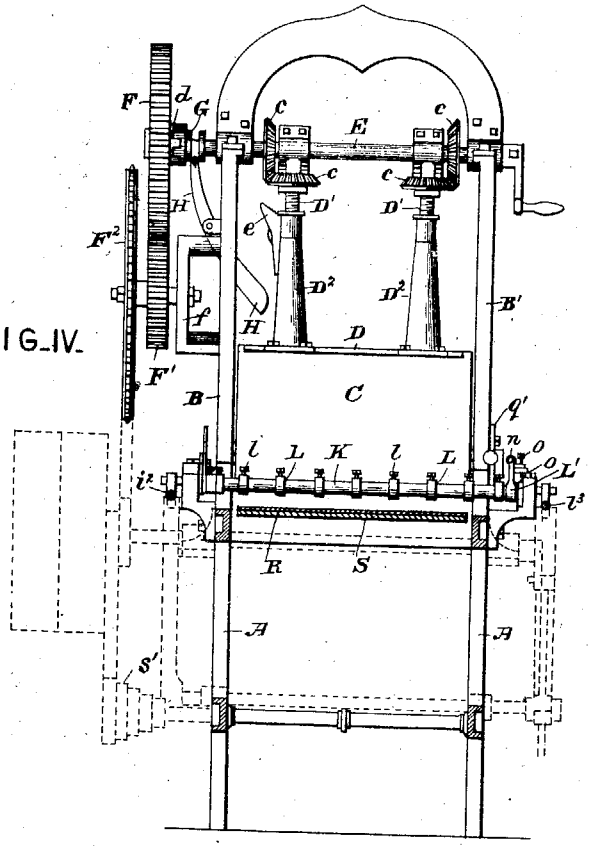
FIG. IV.
Attest:
Geo. T. Smallwood.
Douglas Depersforth
Inventor:
Martin De Tamble.
By Dewing & Dewing
atty.

6 Sheets—Sheet 5.
M. DE TAMBLE.
Assignor to ROTH, MCMAHON & CO.
CAKE, JUMBLE, AND SNAP MACHINE.
No. 10,691. Reissued Feb. 23, 1886.
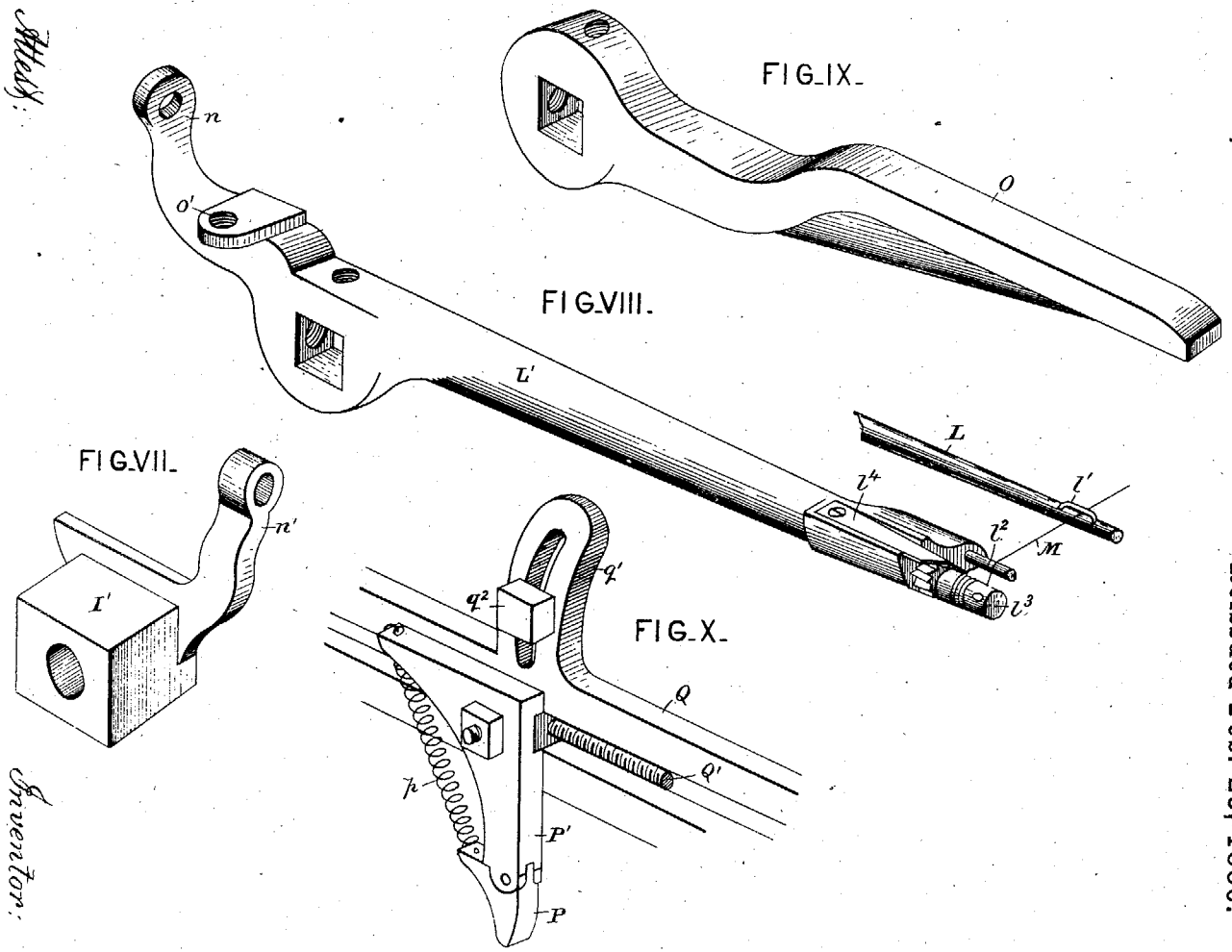
Attest:
Geo. T. Smallwood.
Douglas Depienforth.
Inventor:
Martin De Tamble.
By Banning & Banning
Atty.

6 Sheets—Sheet 6.
M. DE TAMBLE.
Assignor to ROTH, MCMAHON & CO.
CAKE, JUMBLE, AND SNAP MACHINE.
No. 10,691. Reissued Feb. 23, 1886.
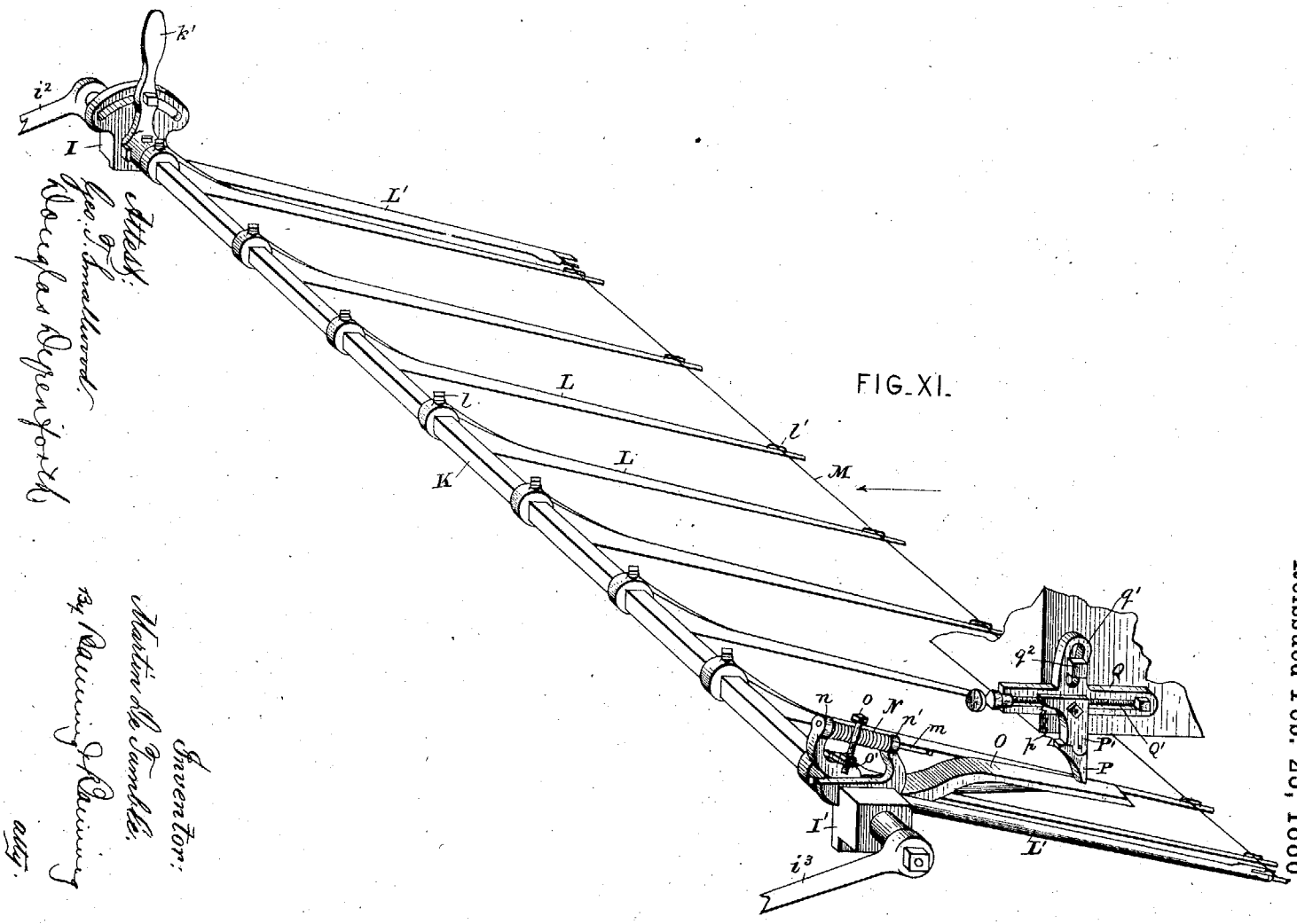
Attest:
Geo. T. Smallwood.
Douglas Depenforth
Inventor:
Martin de Tamble.
By Banning & Banning
Atty.

UNITED STATES PATENT OFFICE.

MARTIN DE TAMBLE, OF CHICAGO, ILLINOIS, ASSIGNOR TO ROTH, McMAHON & CO., OF SAME PLACE.

CAKE, JUMBLE, AND SNAP MACHINE.

SPECIFICATION forming part of Reissued Letters Patent No. 10,691, dated February 23, 1886.

Original No. 278,318, dated May 29, 1883. Application for reissue filed May 29, 1885. Serial No. 167,082.

*To all whom it may concern:*

Be it known that I, MARTIN DE TAMBLE, of Chicago, in the county of Cook and State of Illinois, have invented a certain new and useful Improvement in Cake, Jumble, and Snap Machines, of which the following is a specification.

The object I have in view is to produce a soft-dough machine of the class having wire knives working with four movements, which machine will be simpler and more efficient than those heretofore constructed, can be operated with less power, will be subject to less strain, and be more durable in use, and will be adapted for making cream bars as well as all other kinds of cakes, jumbles, and snaps.

My invention therein consists in the several peculiar devices and combinations of devices employed by me for this purpose, as fully hereinafter explained, and pointed out by the claims.

In the accompanying drawings, forming a part hereof, Figure I is a side elevation of the machine; Fig. II, an elevation from the opposite side; Fig. III, a vertical longitudinal section through the center of the machine; Fig. IV, a vertical cross-section taken in front of the sliding knife-frame and the dough-box on line 4; Fig. V, a perspective view of the adjustable bearing-block for the cross-bar of the sliding knife-frame; Fig. VI, a vertical section through such bearing-block; Fig. VII, a perspective view of the other sliding bearing-block of the knife-frame; Fig. VIII, a perspective view of the end arm of the knife-frame and of the end of one of the other arms; Fig. IX, a view of the dog-arm of the knife-frame; Fig. X, a view of the dog and a part of its supporting-bar, and Fig. XI a detached view of the knife-frame and the dog when such frame is being retracted.

Like letters denote corresponding parts.

A is the main frame of the machine, from the sides of which rise the uprights B B′, between which the dough-box C is secured. This dough-box is raised above the horizontal frame A, and has the cup-plate *a*, provided with openings or cups through which the dough is forced, removably secured in its bottom by sliding into dovetail ways in the bottom of the box, and above such cup-plate the dough-box has a sliding cut-off, *b*, for closing the dough-cups when desired.

The follower D is worked vertically in the dough-box by means of screws D′, which turn in sockets $D^2$, secured to the follower, and are hung from a horizontal shaft, E, journaled in boxes in the uprights B B′, and are revolved by such shaft through bevel-gears *c*. One end of the shaft E receives a hand-crank by which the follower is raised, while the other end of such shaft, outside of the upright B, has mounted loosely upon it the cog-wheel F. The hub of this cog-wheel on its inner side is provided with clutch-teeth *d*, which engage with the teeth of a sliding clutch-sleeve, G, feathered on the shaft E. This sliding clutch is thrown into and out of connection with the teeth *d* by a lever, H, which projects inwardly through the standard B above the follower.

A beveled block, *e*, is secured to the side of the nearest screw-socket $D^2$ at the upper end thereof, which block strikes the end of the lever H when the follower has reached the bottom of the dough-box, and throws the clutch out of connection with the teeth of the hub of the cog-wheel in time to prevent the follower from being forced through the bottom of the dough-box. I do not, however, claim in this application the automatic device for uncoupling the follower from the driving mechanism, since I propose to make a separate application for patent on the same.

The cog-wheel F meshes with a pinion, F′, below it, which is mounted on a spindle adjustable in a curved slot formed in a plate, *f*, supported from the outside of the standard B.

The pinion F′ can be removed from the machine and a larger or smaller pinion substituted for it, so that the speed of the follower can be changed as desired, the slotted plate *f* permitting the adjustment required for the different-sized pinions.

Secured to the pinion F′, so as to turn therewith, is a sprocket-wheel, $F^2$, which is revolved by a driving-chain, $F^3$, from the wheel $F^4$ on the driving-shaft G. The slot in the plate *f* is formed on the curve of a circle struck from the center of the shaft G, so that the change in size of the pinion F will not affect the driving-chain. The driving-shaft G has a pulley, G′, to which the power that operates the machine is applied.

It will be seen that through the chain, wheels, gears, and screws described the follower will be given a continuous even movement, which is independent of the other movements of the machine, and can be readily changed in speed without necessitating a corresponding change of the other movements. To the other end of the driving-shaft is secured a crank, $g$, which is connected by a rod, $g'$, with a horizontal arm, $g^2$, projecting from a rock-shaft, $h$, journaled transversely in the lower part of the main frame. This rock-shaft has two vertical arms, $i$ $i'$—one at each end—which at their upper ends are connected by rods $i^2$ $i^3$ with the sliding blocks I I′ of the knife-frame. These blocks work in ways $I^2$ $I^3$, and carry the knife-frame, as will be presently described. A positive horizontal sliding movement back and forth is imparted to the blocks I I′ by means of the rocking connection with the driving-shaft. The pitman-rod $g'$ is adjustably connected with the horizontal rock-arm $g^2$, so that the position of the sliding knife-frame can be regulated. To provide for this adjustment the rod $g'$ passes loosely through a collar, $j$, pivoted in the forked end of the rock-arm $g^2$, and has nuts $j'$ both above and below such collar, which turn on a screw-thread cut on such rod $g'$.

In the sliding blocks I I′ is journaled the cross-bar K of the knife-frame, the ends of such bar projecting outwardly through the blocks for making connection with the rods $i^2$ $i^3$. In the block I the bar K passes eccentrically through a turning box, $k$, which has a handle, $k'$, and is held at any point of adjustment by a bolt, $k^2$, which connects the handle with a curved slot, $k^3$, formed in an upward extension of the block I, as shown in Fig. V. By journaling the cross-bar K in an eccentric at one end, such cross-bar can be raised and lowered at that end by turning the eccentric, and this enables the wire knife to be adjusted so that it will bear equally on all the cups of the dough-box.

In fitting the blocks I I′ in the ways $I^2$ $I^3$, and in boring such blocks, the result will be more or less inaccurate, and the cross-bar K will not be exactly parallel with the cup-plate, and consequently the wire knife will not bear equally on the cups. It is essential for the successful working of the machine that the wire knife should bear on all the cups alike, and by adjusting the height of the bar K at one end this can be accomplished.

To the cross-bar K are secured the arms L L′, which carry the wire knife M on their ends. These arms project from the bar K to a point under the dough-box, and are secured to such bar by set screws $l$, so that they can be adjusted thereon.

In the operation of the machine, it is necessary that the knife-arms should be arranged to move one between each pair of dough-cups, and since the cups of the various cup-plates used in the machine are of different size and number, it becomes necessary, in changing the cup-plate, to adjust the knife-arms laterally on the cross-bar. When there are more arms than required, the superfluous arms are pushed together close to one end of the cross-bar. The cross-bar is made angular in cross-section, or is provided with a feather, the purpose of which construction is to always keep the arms at the same height, so that the baker will have no trouble to preserve the vertical adjustment of the arms when he finds it necessary to shift them laterally.

The wire knife is secured to the end arm, L′, nearest the block I, and is passed through loop $l'$ on the ends of the intermediate arms, L, Figs. VIII and XI. It then passes over a pin, $l^2$, on the end arm, L′, and around a turning stud, $l^3$, carried by such arm. The stud $l^3$ is held in one direction by a spring-pawl, $l^4$, engaging with ratchet-teeth on the stud, so that by turning such stud the wire knife can be given any desired tension. The arms L L′ are thrown upwardly to bring the wire knife in the right position for cutting the dough hanging from the cup by means of a spiral spring, N, which is sleeved on a bolt, $m$, secured in an upward and rearward extension, $n$, of the arms L′, and sliding through an arm, $n'$, rising from the block I′. This spring presses the extension $n$ backward and downward, and raises the ends of the arms and the wire knife.

The upward movement of the wire knife is governed by a set-screw, $o$, which turns in a lug, $o'$, on the rearward extension of the arm L′, and sets against the sliding block I′. This set-screw may be provided with a jam-nut above the lug $o'$, for holding it at any point of adjustment.

To the cross-bar K is also secured the dog-arm O, which projects therefrom in the same direction as the knife-arms, but above the level of such knife-arms. This dog-arm is curved upwardly, as shown, and then extends horizontally to its end to form a bearing for the pivoted dog P. This dog is pivoted to the lower end of a block, P′, so that it can swing past a vertical line only in one direction, and such dog is drawn back into a vertical position, when swung on its pivot, by a spring, $p$. The block P′ is supported by a slotted bar, Q, and has a nut sliding in the slot of such bar. The bar Q is pivoted at one end by a bolt, $q$, to the outside of the standard B′, and near its center has an upwardly-projecting slotted finger, $q'$, through which a holding-screw, $q^2$, turns into a hole in the standard B′. This arrangement permits a vertical adjustment of the dog.

A screw, Q′, turns through the nut on the block P′, and furnishes the means for adjusting the pivoted dog horizontally. In the forward movement of the knife-arms the spring N holds the knife close up to the dough-cups, and the dog P is swung forward on its pivot by the arm O. When, however, the raised portion of the arm O has passed the pivoted dog, such dog is drawn into a vertical position by its spring, and in the return movement of the knife the arm O will be forced downwardly by the dog, and will carry with it the other arms and the wire knife. There is thus given to the wire knife the four movements necessary for the successful operation of the machine—viz., a forward movement on the level with the cups to cut off the dough, a downward movement, a return movement below the cups, so as to avoid the dough, and an upward movement to the first position. These movements are accomplished in my machine by means which are certain and efficient in their action, and which can be operated with less power than required by the machines heretofore constructed for this purpose.

The wire cutting knife, it will be seen, is given a horizontal sliding movement below the level of the cups and a vertical movement at each end of its horizontal movement. It moves in the direction of the travel of the feed-apron and cuts square across all the cups at the same time. This knife is not liable to be broken, and works with the minimum amount of friction and strain, and cuts the dough clean from the cups. The mechanism for feeding the follower in the dough-box is independent of the knife-frame, and gives such follower a continuous feed, thus adapting the machine for making cream bars as well as all other kinds of cakes and snaps. The speed of the follower-feeding mechanism can also be changed without interfering with the movement of the knife-frame.

R is the endless apron of the machine, which carries the pans. This apron extends over the operating-roller $r$ at one end of the main frame, and over a roller, $r'$, in the other end, which is journaled in sliding boxes adjustable by screws $r^2$. The shaft of the operating-roller has mounted on one end a stepped pulley, $s$, which is revolved by a belt from a stepped pulley, $s'$, journaled on a stud secured to the lower part of the frame A. The pulley $s'$ is operated by a belt-connection with a pulley fixed on the driving-shaft G. The pulley $s$ is mounted loosely on the shaft of the roller $r$, and is connected therewith, so as to drive the roller by a pawl and ratchet. (Not shown.) The other end of the roller-shaft has a hand-wheel, $t$, by which the apron can be advanced at any time in order to prevent the dropping of the cakes on the edges of the pans.

Under the upper side of the apron is a table, S, over which the apron travels. This table at the forward end of the machine is supported on a cross-rod, $u$, to which it is pivotally secured by eye-straps, as shown. At its other end the table S rests upon wipers $v$, which are worked by a hand-lever, $w$. This hand-lever is held at any point of its movement by a bolt and slotted plate. By moving the wipers the table S can be raised and lowered at one end.

In handling the harder kinds of soft dough—as, for instance, snap-dough—it is necessary that the apron should travel closer to the cups than with other doughs, since the harder dough is thrown forward somewhat by the wire knife, and the snaps will strike edgewise and turn over unless the apron is close up to the cups. In my machine the snaps are further prevented from alighting wrong side up by the upward inclination of the apron when raised at one end. This presents an inclined surface for the snaps to strike, so that when the snaps strike on their edges they will fall back, rather than turn over in a forward direction.

It is evident that many of the devices of my machine could be changed somewhat in detail and still accomplish the same result.

It will be observed that my cutting wire or knife is brought or passed under the dough-box by the forward movement of the sliding frame, and in such a way as to press up snugly against the bottom of the cups at every point as it slides or passes under them, and in this respect it differs from the Vail and similar machines, in which the cutting-wire is brought around to and under the dough-box by a swinging or circular movement, which prevents it from coming or pressing up closely against the bottom of the cups, except at their front and back sides, and thus renders it impractical and useless in the cutting of large cakes.

What I claim as my invention is—

1. In a soft-dough machine, the combination, with the follower, and devices, substantially as described, for moving the same, of the dough-box, the traveling apron, the single wire knife, and the arms L L′, adjustably secured to and projecting from the cross-bar K to a point under the dough-box, and mechanism, substantially as described, for reciprocating the knife, and devices, as set forth, for giving the knife a vertical movement at or near the end of each horizontal movement, substantially as described, and for the purpose set forth.

2. In combination with the frame of a soft-dough machine, having guiding-ways and bearings fitted to said ways, one of said bearings being provided with a projection, $n'$, of a knife-frame pivoted on said bearings and provided with arm $n$ and cam-arm O, a spring interposed between the projection $n'$ and arm $n$, and dog P P′, rigidly attached to the frame of the machine in the line of movement of cam-arm O, substantially as and for the purpose set forth.

3. The frame of a soft-dough machine, provided with guiding-ways and bearings fitted to such ways, a wire-knife frame journaled in such bearings, and a spring connecting such wire-knife frame with the bearings, substantially as described, whereby the knife is kept in an elevated position unless positively depressed, substantially as and for the purpose set forth.

4. The frame of a soft-dough machine, provided with guiding-ways and bearings fitted to such ways, a wire-knife frame journaled in such bearings, and a spring connecting such wire-knife frame with the bearings, substantially as described, whereby the knife is kept in an elevated position unless positively depressed, and devices, substantially as described, for depressing the said knife-frame and knife at or near the beginning of its retrograde movement, and for releasing it on its forward movement, as set forth.

5. In a soft-dough machine, the combination, with the sliding pivoted knife-frame, of a pivoted dog for throwing the knife-frame downward on its return movement, mechanism for adjusting the dog both horizontally and vertically, and mechanism for throwing the knife-frame upwardly on its forward movement, substantially as described and shown.

6. In a soft-dough machine, the combination, with the sliding pivoted knife-frame, of the dog P, pivoted to the block P′, the spring *p*, for keeping such dog in a vertical position, the slotted adjustable bar Q, and screw Q′, substantially as described and shown.

7. In a soft-dough machine, the horizontally-sliding cross-bar K, carrying the knife-arms, in combination with a vertically-adjustable bearing at one end thereof, substantially as and for the purpose set forth.

8. In a soft-dough machine, the combination, with the sliding blocks I I′, of the cross-bar K, carrying the knife arms and journaled in such sliding blocks, and the turning eccentric bearing *k* in one of such blocks, substantially as described and shown.

9. In a soft-dough machine, the combination, with a dough-box provided with cup-plates having differently-formed cups, of the knife-arms, an annular cross-bar upon which the arms are mounted, and screws for securing the arms adjustably to the cross-bar, substantially as described and shown.

10. In a soft-dough machine, the combination of a stationary frame, a sliding frame on said stationary frame, a wire knife extending crosswise of the machine and confined at its ends to the sliding frame, and a finger or fingers secured to the sliding frame for supporting such wire at its central or free part and pressing it against the bottoms of the dough-cups at every point, substantially as described.

MARTIN DE TAMBLE.

Witnesses:
JOHN MCMAHON,
EPHRAIM BANNING.